(12) United States Patent
Young

(10) Patent No.: US 7,402,211 B2
(45) Date of Patent: Jul. 22, 2008

(54) CLEANING CHEMICAL DISPENSING METHOD

(76) Inventor: Ronald Alexander Young, 95 Mushroom Green, Dudley Wood, West Midlands (GB) DY2 0EE (*) Notice: Subject to any disclaimer, the term of this patent is extended or adjusted under 35 U.S.C. 154(b) by 0 days.

(21) Appl. No.: 11/643,901

(22) Filed: Dec. 22, 2006

(65) Prior Publication Data

US 2007/0101532 A1 May 10, 2007

Related U.S. Application Data

(60) Division of application No. 11/260,267, filed on Oct. 28, 2005, now abandoned, which is a continuation-in-part of application No. 11/258,190, filed on Oct. 26, 2005, now abandoned, which is a continuation-in-part of application No. 10/976,105, filed on Oct. 28, 2004, now abandoned.

(30) Foreign Application Priority Data

Oct. 18, 2005 (GB) ................................. 0521126.3

(51) Int. Cl.
*B08B 7/00* (2006.01)
*G01F 11/00* (2006.01)
(52) U.S. Cl. .......................... 134/6; 220/4.21; 220/553; 15/260; 222/1
(58) Field of Classification Search ........... 15/260–264, 15/119.1, 119.2, 120.1, 120.2; 220/697, 220/501, 23, 83, 87, 4.21, 553; 141/2, 18, 141/100; 222/1, 26, 157, 158, 179.5; 134/6
See application file for complete search history.

(56) References Cited

U.S. PATENT DOCUMENTS

| 1,882,918 | A | | 10/1932 | Robb |
| 4,550,602 | A | * | 11/1985 | Burke et al. .................. 73/428 |
| 4,751,763 | A | | 6/1988 | Rose et al. |
| 5,061,392 | A | | 10/1991 | Buregge et al. |
| 5,195,567 | A | | 3/1993 | Tyree, Jr. |
| 5,237,720 | A | * | 8/1993 | Blase et al. .................... 15/321 |
| 6,006,397 | A | * | 12/1999 | Williams et al. .............. 15/261 |
| 6,260,230 | B1 | | 7/2001 | Hunt |

(Continued)

FOREIGN PATENT DOCUMENTS

EP 1 358 832 11/2003

(Continued)

*Primary Examiner*—Shay L Karls
(74) *Attorney, Agent, or Firm*—Young & Thompson

(57) ABSTRACT

A cleaning chemical dispensing system includes: a liquid chemical additive having a predetermined viscosity; a mop bucket; a mop wringer provided on the bucket; a first indicator indicating a first volume of cleaning liquid in the bucket; and a reservoir for the additive, the reservoir positioned above the first indicator, and having a base, one or more upstanding walls continuously contiguous with and fully surrounding the base, an opening opposite the base for pouring the additive into the reservoir, a metering orifice in the base, and a second indicator indicating a second volume for the additive which corresponds to the first volume of the bucket so as to provide a required ratio of additive to cleaning liquid, the orifice being dimensioned to correspond to the predetermined viscosity of the additive, so that the additive can be poured into the reservoir before any significant amount of additive passes through the orifice.

1 Claim, 4 Drawing Sheets

U.S. PATENT DOCUMENTS

| | | |
|---|---|---|
| 6,540,109 B1 | 4/2003 | Klima et al. |
| 6,728,990 B1 | 5/2004 | Jones |
| 2003/0146246 A1 | 8/2003 | Arsenault et al. |

FOREIGN PATENT DOCUMENTS

| | | |
|---|---|---|
| GB | 2260691 | 4/1993 |
| GB | 2323776 | 10/1998 |
| WO | WO 03/065869 | 8/2003 |

\* cited by examiner

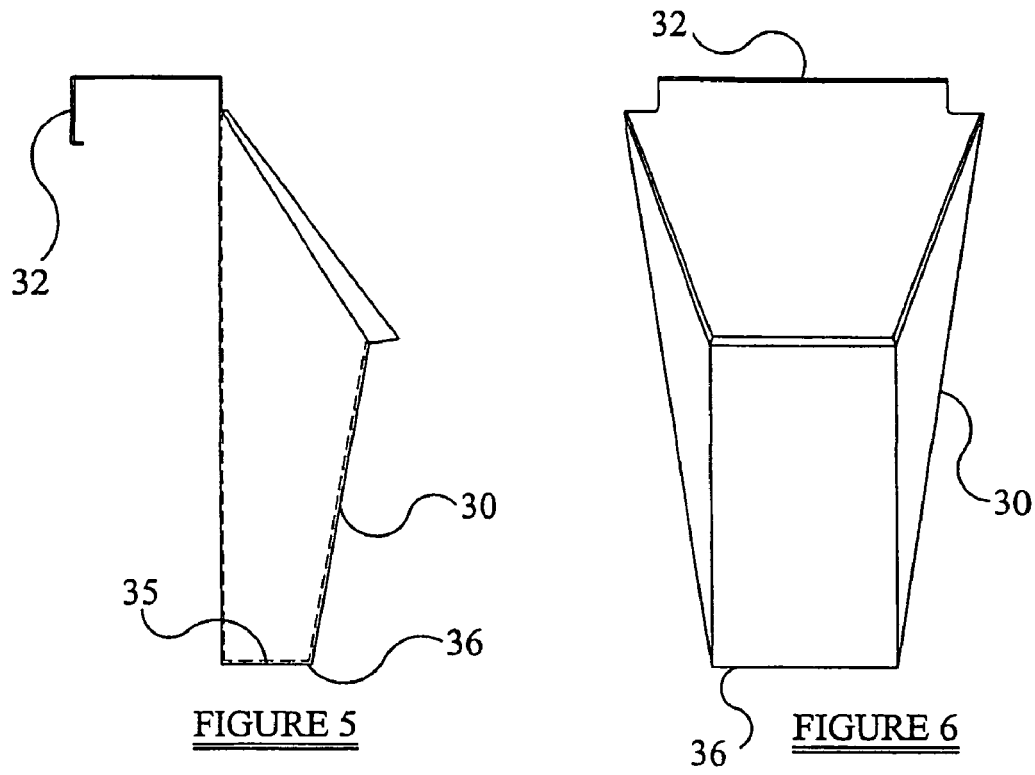
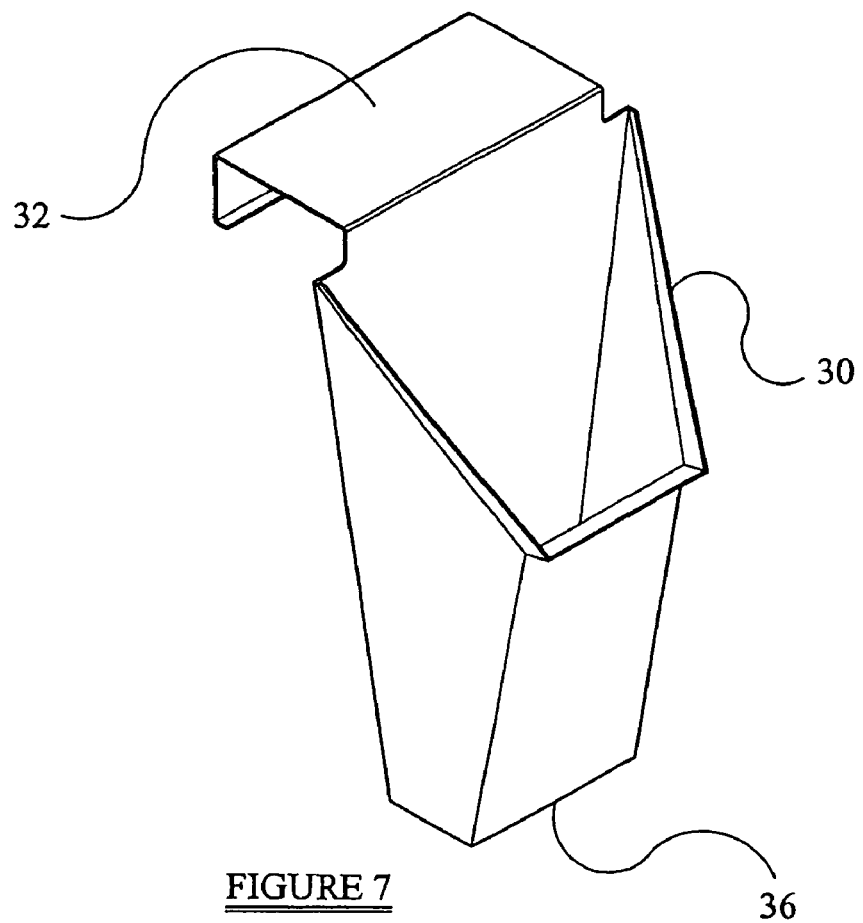

CLEANING CHEMICAL DISPENSING METHOD

CROSS REFERENCE TO RELATED APPLICATIONS

This application is a division of application Ser. No. 11/260,267 filed on Oct. 28, 2005, now abandoned, which is a continuation-in-part of application Ser. No. 11/258,190 filed on Oct. 26, 2005 now abandoned. Ser. No. 11/258,190 is a continuation-in-part of Ser. No. 10/976,105 filed on Oct. 28, 2004, now abandoned.

BACKGROUND OF THE INVENTION

This invention relates to mop cleaning buckets and wringers for janitorial cleaning use.

Chemicals, such as detergents and disinfectants, are often added to mop bucket cleaning water as a cleaning aid. Presently, these chemicals are intended to be added to mop buckets by measuring the correct amount to be added according to the bucket size, or by dropping in a sachet containing a prescribed chemical quantity which is then released into the cleaning water. However, it is typical that the cleaning chemicals are not precisely added, but merely poured into the mop bucket on a "that looks about right" basis, which all too frequently becomes a 'more is better' over-addition. Dumping in excessive cleaning chemicals is wasteful of the costly materials, and can be injurious to surfaces. It is obviously preferable to use an appropriate amount of chemical.

A sachet of cleaning chemical offers a predetermined quantity of chemical additive. However, sachets are expensive to produce, result in litter, and a user cannot be relied upon to add a correct number of sachets dependent on the amount of cleaning water in the bucket.

Complying with manufacturer's instructions for cleaning chemical dosing has always been a significant problem in the cleaning industry. The tendency of cleaners is always to overdose. Very rarely do cleaners 'read the label' to follow manufacturer's instructions for precise measurement of chemicals. In most cases, without measuring the volume of water in the mop bucket, the cleaner pours what they "believe" to be a fair portion of detergent directly into the water without any effort to check amounts. In the trade, it is universally described as the "glug glug" process.

Various procedures have been devised in an attempt to "control" the amount of cleaning chemicals being added to mop buckets. Some of these arrangements are extremely complicated, wasteful, impractical and ineffectual.

Portion pack sachets, as mentioned above, are one type of method used to control the ratio of chemical agent to cleaning water. The use of plastic packaging to measure a precise portion of chemicals is widespread. The main problem with this method is that mop bucket capacity variance is huge (up to 60 different capacities and styles of mop bucket exist in the United Kingdom market alone) and this makes such a system totally unreliable. The cost of packaging each tiny portion is hugely wasteful. The whole system of sachet proportioning is an economic and environmental failure.

Mix-and-measure metering systems are also known. However, these kinds of systems are expensive and complicated to operate in a cleaning industry where transient labour, often being foreign language speaking, is normal. Training is thus difficult, and misuse of the system is rife.

Detergent automatically added to tap water is another method used. This method is common, and is often used in kitchens where access to running water is easily available. Detergent is mixed with the water before reaching the tap, so that when the tap is operated, a pre-mixed liquid of water and chemical additive flows out. This system is used for all aspects of cleaning from dishwashing to floor mopping. The huge weakness of this system is that floor mopping cannot be treated in the same manner as dishwashing. Consequently, the ratio of chemical to cleaning water is often inappropriate for surface cleaning.

The present invention seeks to overcome these problems in an inexpensive but reliable cleaning system, utilising bulk supply of chemical agent.

SUMMARY OF THE INVENTION

According to a first aspect of the present invention, there is provided A cleaning chemical dispensing system comprising:
 a liquid chemical additive having a predetermined viscosity;
 a mop bucket;
 a mop wringer provided on the mop bucket;
 a first indicator which indicates a first volume of cleaning liquid in the mop bucket; and
 a secondary reservoir for the liquid chemical additive, the secondary reservoir being at a position spaced above the first indicator, and having a base, one or more upstanding walls continuously contiguous with and fully surrounding the base, an opening opposite the base for pouring the liquid chemical additive into the secondary reservoir, a metering orifice formed in the base, and a second indicator indicating a second volume of the liquid chemical additive which corresponds to the first volume of the mop bucket so as to provide a required ratio of liquid chemical additive to cleaning liquid,
 the metering orifice being dimensioned to correspond to the predetermined viscosity of the liquid chemical additive, so that the liquid chemical additive can be poured into the secondary reservoir, via the opening, up to the second volume indicated by the second indicator before any, or any significant, amount of the liquid chemical additive passes through the metering orifice.

According to a second aspect of the invention, there is provided a secondary reservoir specifically adapted for use with a cleaning chemical dispensing system, the secondary reservoir comprising:
 a base;
 one or more upstanding walls continuously contiguous with and fully surrounding the base;
 an opening opposite the base for pouring a liquid chemical additive into the secondary reservoir;
 a metering orifice formed in the base; and
 an indicator on the secondary reservoir which indicates a volume of the liquid chemical additive which corresponds to a predefined volume of a mop bucket to be used with the secondary reservoir, so as provide a required ratio of liquid chemical additive to cleaning liquid,
 the metering orifice being dimensioned to correspond to a predetermined viscosity of the liquid chemical additive, so that the liquid chemical additive can be poured into the secondary reservoir, via the opening, up to the volume indicated by the indicator before any, or any significant, amount of the liquid chemical additive passes through the metering orifice.

A cleaning chemical dispensing system provides a secondary reservoir having a metering orifice extending from the secondary reservoir and communicating with the mop bucket so that liquid chemical cleaning additive placed in the secondary reservoir is metered into the cleaning water in the mop bucket.

The objects of the present invention are: to provide a device which can be combined with a mechanical or manual mop wringer for adding a proper amount of cleaning chemicals to cleaning water in janitorial mop buckets; to provide a device for retrofitting existing mop buckets and wringers with a secondary reservoir and metering system for adding cleaning chemicals; and to provide such a system which is well configured for the intended purpose.

The present invention will now be more particularly described, by way of example only, with reference to the accompanying drawings.

BRIEF DESCRIPTION OF THE DRAWINGS

FIG. 5 is a side elevational view of a secondary reservoir, according to the second aspect of the invention, which forms part of a third embodiment of a cleaning chemical dispensing system, in accordance with the first aspect of the invention;

FIG. 6 is a front elevational view of the secondary reservoir shown in FIG. 5;

FIG. 7 is a perspective view of the secondary reservoir shown in FIG. 5;

DESCRIPTION OF THE PREFERRED EMBODIMENTS

Figure 1:
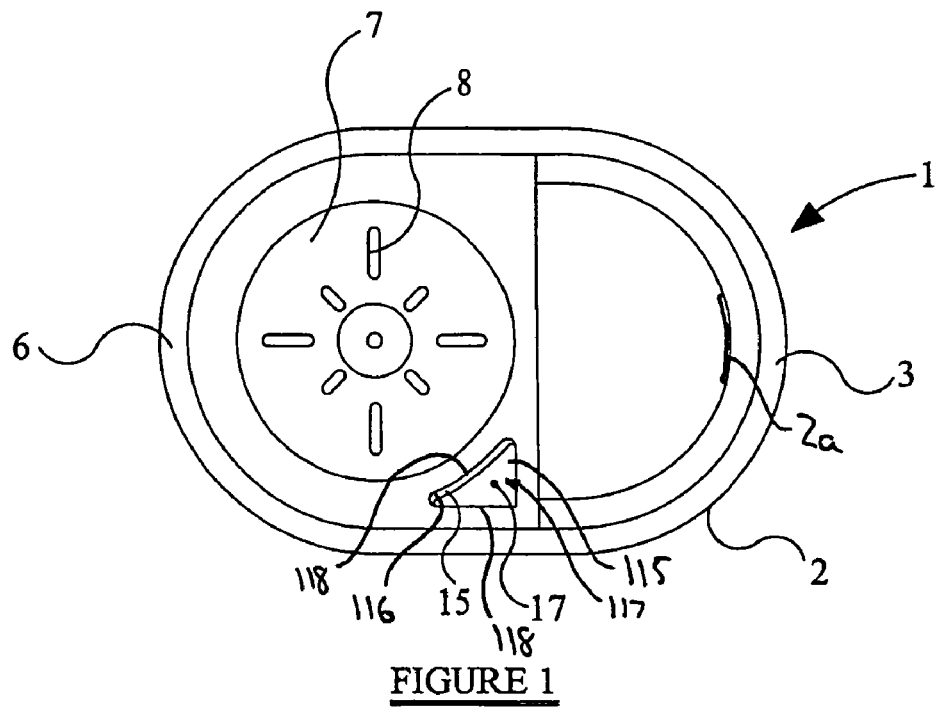
FIG. 1 is a plan view of a mop bucket and a secondary reservoir, according to the second aspect of the invention, which form part of a first embodiment of a cleaning chemical dispensing system, in accordance with the first aspect of the invention.

The reference numeral 1 in FIG. 1 generally designates part of a first embodiment of a cleaning chemical dispensing system. Liquid chemical cleaning additive (not shown) to be dispensed includes, for example, detergent and/or disinfectant, but may also, or alternatively, include wax and any other liquid chemical which is to be added to water and applied to a floor through moping or other application means. Other application means include squeegees, brushes, sponges and the like applicators. The most popular chemicals to be used are general cleaning and/or degreasing type, with viscosities typically in the range of 800-1000 centipoises (cps).

Figure 2:
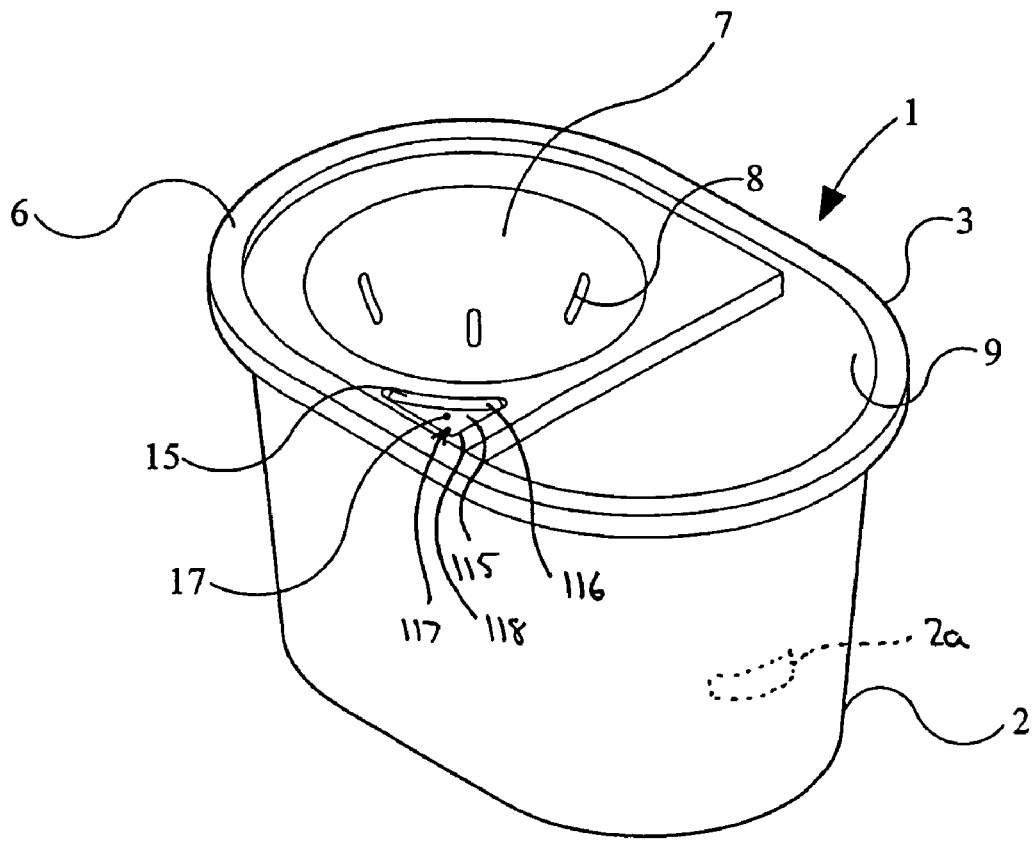
FIG. 2 is a perspective view of the mop bucket and secondary reservoir shown in FIG. 1.

A dispensing device fits to a wringer attachment or directly to a mop bucket 2, or other type of bucket designed to contain a quantity of a primary cleaning liquid, normally water, into which the liquid chemical additive is to be mixed. The bucket 2 may be wheeled and/or have a handle or other feature for portability. The bucket 2 ideally has a strengthened rim 3 for support. In FIGS. 1 and 2, a sieve wringer device 6 is shown. The sieve wringer device 6 is integrally formed with the bucket 2 at or adjacent to the rim 3. The wringer device 6 bas a conical wringing receiver or basket 7 which projects into the bucket 2 and which has drainage openings 8 so that a mop may be laden with cleaning liquid in an open part 9 of the bucket 2 and the cleaning liquid squeezed partly out of the mop by pressing the mop head down into the conical receiver 7.

The wringer device 6 includes a secondary reservoir 15 integrally formed in its top and adjacent to the wringing receiver 7. The secondary reservoir 15 is generally cup or pod shaped. The secondary reservoir 15 is sized to receive and be filled by the liquid chemical additive.

The secondary reservoir comprises a base 115 having a perimeter edge, a plurality of contiguous solid walls 116 upstanding from the perimeter edge of the base 115 and formed to completely surround the base 115, an opening 117 to the secondary reservoir 15 which is defined by the uppermost edges 118 of the walls 116 and which is opposite the base 115, and a metering orifice 17 or aperture which is formed in the base 115.

The metering orifice 17 provides a passage through the material, usually plastics, of the wringer device 6. The metering orifice 17 is dimensioned to correspond to a known viscosity of the liquid chemical additive being used. This is vital, so that the liquid chemical additive can be poured into the secondary reservoir 15 via the opening 117 without any, or any significant amount, of the liquid chemical additive draining through the metering orifice 17, before the secondary reservoir 15 is filled. By way of example, in the case when the viscosity of the liquid chemical additive is in the range of 800 to 1000 cps, the major dimension of the metering orifice is typically in the range of 1 millimetre (mm) to 6 mm, and more preferably in the range of 2 mm to 5 mm.

Other orifice sizes may be found to be suitable.

To achieve a preferred dilution of cleaning liquid by liquid chemical additive, the mop bucket 2 is provided with a first indictor element 2a, typically being a clearly visible mark moulded on the interior surface of a wall of the bucket 2, or simply being an internal edge or corner of the bucket, and/or being a surface or edge of the wringer, such as the lowermost surface or edge projecting into the bucket. This first indicator 2a defines a first volume and is the level to which cleaning liquid is poured into the bucket 2. The first indicator 2a is spaced below a bottom surface of the secondary reservoir 15, so that liquid chemical additive falls from the metering orifice to the cleaning liquid in the mop bucket.

The uppermost edges 118 of the walls 116 of the secondary reservoir 15 constitute a second indicator which indicates a second volume and is the level to which liquid chemical additive is poured through the opening and into the secondary reservoir 15.

The volumetric capacity of the secondary reservoir 15 is such that the first volume of the mop bucket 2 and the second volume of the secondary reservoir 15 result in a dilution ratio of the liquid chemical additive to cleaning liquid being approximately 1:230.

Since the dimension of the metering orifice 17 restricts the flow of the liquid chemical additive into the mop bucket 2, the liquid chemical additive can be poured into the secondary reservoir 15, up to the second volume indicated by the second indicator, before any, or any significant amount, of the liquid chemical additive passes through the metering orifice.

The reservoir 15 may be of any shape and the volumetric capacity, defined by the second indicator, is selected to provide the 1 to 230 ratio.

Where other dilution ratios are required, a secondary reservoir with an appropriate second indicator, either being a mark on its wall or being an edge of its wall or walls, is utilised by which the required volumetric capacity is defined.

Additionally, multiple metering orifices in the base can be utilised.

Figure 3:
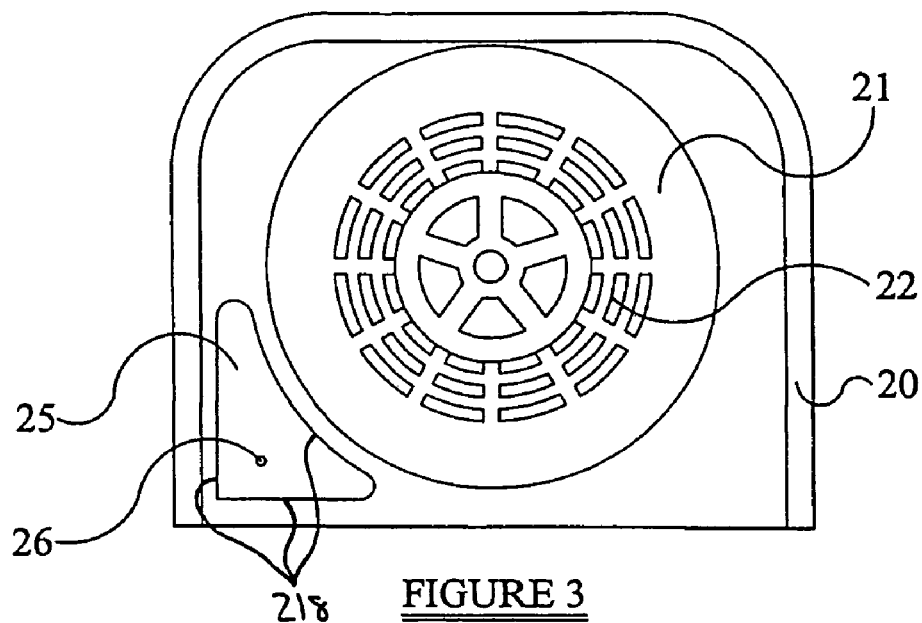
FIG. 3 is a plan view of a manual mop wringer and a secondary reservoir, according to the second aspect of the invention, which form part of a second embodiment of a cleaning chemical system, in accordance with the first aspect of the invention.
Figure 4:
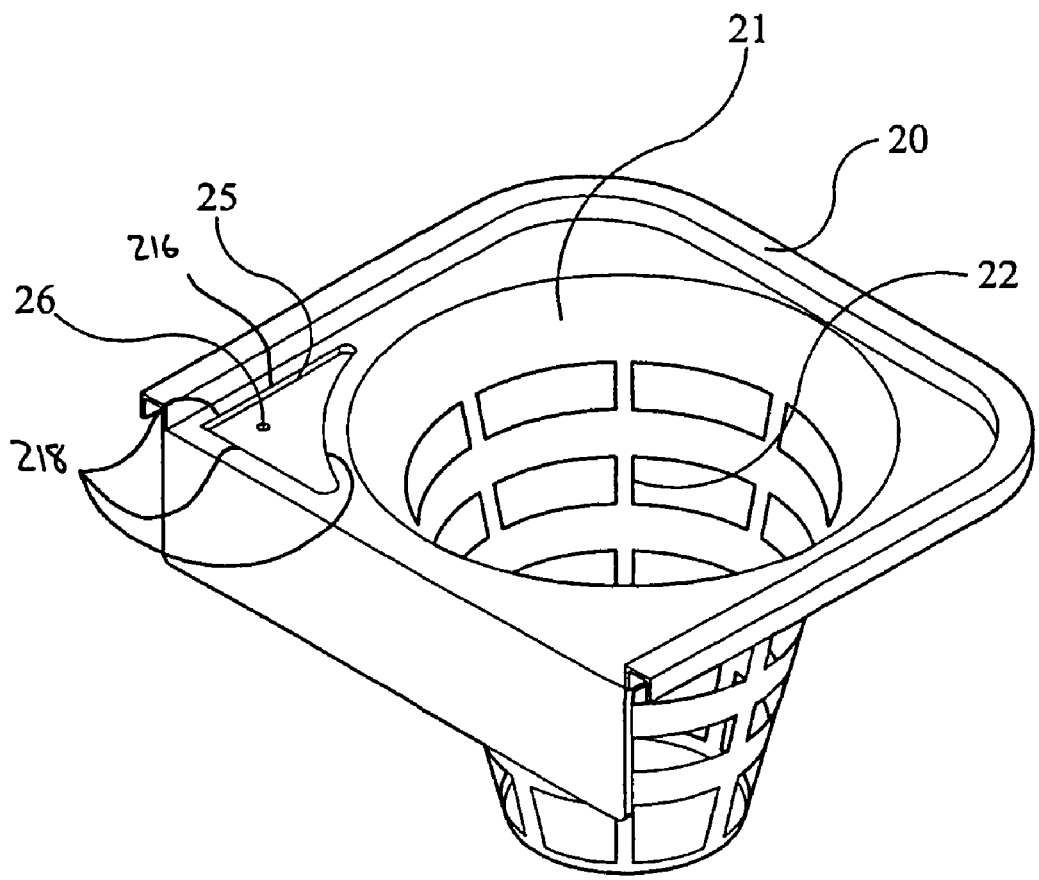
FIG. 4 is a perspective view of the mop wringer and secondary reservoir shown in FIG. 3.

A second embodiment of the cleaning chemical dispensing system is shown in FIGS. 3 and 4. In this embodiment, a removable sieve wringer device 20 is provided. Therein, a conical receiver 21 has a different series of openings 22 than shown in the receiver 7 of the first embodiment. The device 20, like the device 6, forms a cap over a portion of the open top of a mop bucket (not shown), and engages with a bucket rim to remain detachably connected to the rim. Similarly to the first embodiment, the manual wringer device 20 has an integral secondary reservoir 25, being generally cup or pod shaped.

The features of the secondary reservoir 25 are similar to those described above with reference to the first embodiment, and thus further detailed description is omitted.

As in the first embodiment, uppermost edges 218 of walls 216 of the secondary reservoir 25 define a second indicator, and the mop bucket to which the wringer device 20 is to be attached, and/or the wringer itself, has a first indicator to enable a required dilution ratio of cleaning liquid and liquid chemical additive to be achieved.

Metering orifice 26 is again dimensioned dependent on a viscosity of the liquid chemical additive to be used, so that no, or no significant, draining of the liquid chemical additive occurs before the secondary reservoir 25 is filled to the second indicator.

Regarding FIGS. 5 to 7, a removable secondary reservoir 30 is shown therein and forms part of a third embodiment of a cleaning chemical dispensing system. Apart from the secondary reservoir 30 being removable, the other essential features are the same as those described above with respect to the first and second embodiments, and thus further detailed description will be omitted.

The secondary reservoir 30 has a top hanger or hook 32 for suspending the reservoir 30 from a top rim of a mop bucket. Like the reservoirs 15 and 25, the reservoir 30 can be of any configuration, but has a volumetric capacity defined by a second indicator as described above which corresponds to a first volume indicated by a first indicator on or in the mop bucket, and/or on the wringer, and which provides the desired ratio of dilution of liquid chemical additive to cleaning liquid.

Metering orifice 35 is provided through base 36 of the reservoir 30 for passage of the liquid chemical additive to run or drip into the cleaning liquid held in the mop bucket below the secondary reservoir, once the secondary reservoir is filled to the second indicator.

Figure 8:
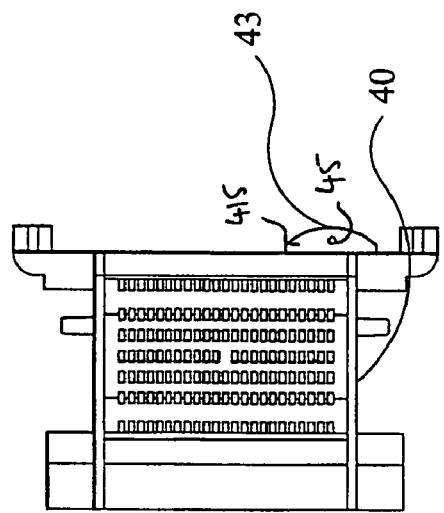
FIG. 8 is a plan view of a mechanical mop wringer and a secondary reservoir, according to the second aspect of the invention, which form part of a fourth embodiment of a cleaning chemical dispensing system, in accordance with the first aspect of the invention.
Figure 11:
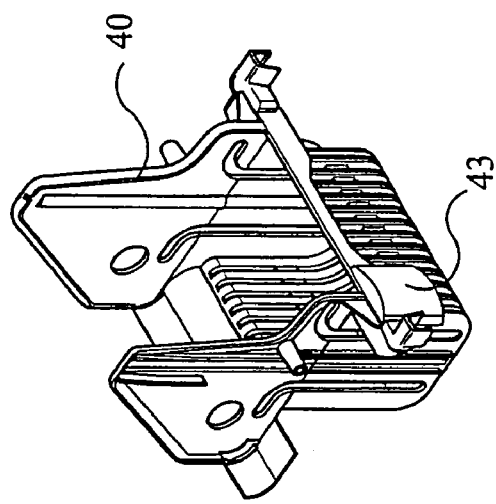
FIG. 11 is a perspective view of the mop wringer and secondary reservoir shown in FIG. 8.
Figure 9:
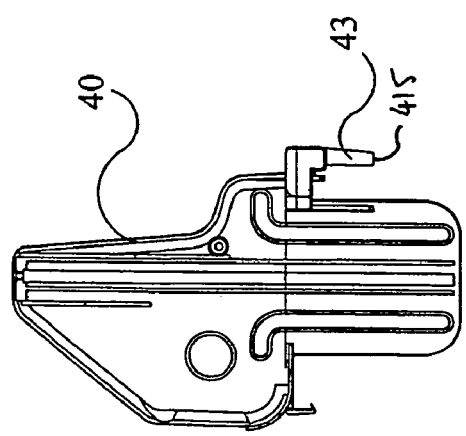
FIG. 9 is a side elevational view of the mop wringer and secondary reservoir shown in FIG. 8.
Figure 10:
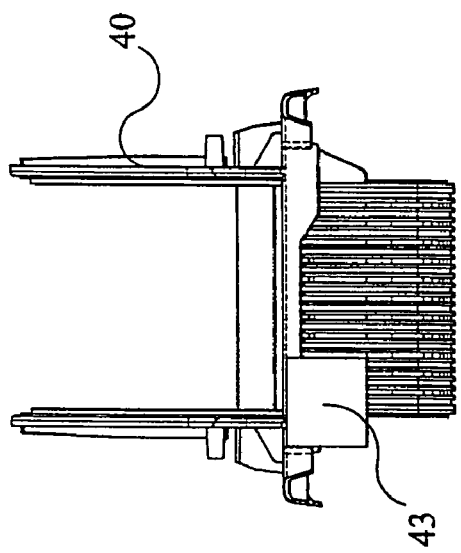
FIG. 10 is a front elevational view of the mop wringer and secondary reservoir shown in FIG. 8.

A mechanical press wringer 40 is shown in FIGS. 8 to 10, and forms part of a fourth embodiment of a cleaning chemical dispensing system. This wringer 40 conventionally mounts atop a mop bucket. A secondary reservoir 43 is attached to the press wringer assembly 40, on one side thereof so as to project into the mop bucket and above a level of cleaning liquid therein, when the wringer 40 is mounted. The secondary reservoir 43 has all of the essential features as described with respect to the foregoing embodiments, and thus further detailed description is again omitted.

The secondary reservoir 43 includes a metering orifice 45 in a base 415 of the secondary reservoir 43, the major dimension of the metering orifice 45 corresponding to a viscosity of liquid chemical additive to be poured into the secondary reservoir 43, so that a second volume of liquid chemical additive in the secondary reservoir 43 can be reached before any, or any significant amount, of the liquid chemical additive is metered through the metering orifice 45 and into a first volume of cleaning liquid held in the mop bucket.

The reservoir 43 is intended to be securely connected to the wringer 40, possibly by being integrally moulded as part of the wringer 40, so that it cannot be readily removed and discarded by janitorial staff. A mechanical press wringer normally has a moveable, perforated wall that is caused to press toward a stationary wall by a handle and hinge assembly, so that cleaning liquid is squeezed from a mophead placed between the moveable and stationary parts.

In all forms of the device, the design is such that the base of the secondary reservoir does not touch or extend down into the mop bucket cleaning liquid. Rather, the liquid chemical additive placed in the secondary reservoir is metered, bleeds or drips down through the metering orifice in the base and falls into the cleaning liquid.

The volumetric capacity defined by the second indicator of each secondary reservoir corresponds to the volumetric capacity defined by the first indicator on the mop bucket and/or wringer, so that for a given liquid chemical additive, a correct dilution of cleaning liquid is achieved.

Preferably, there is only one first indicator defining only one first volume, and only one second indicator defining only one second volume.

Since the size of the opening of the cleaning chemical reservoir gives the "impression" that the liquid chemical additive can be spilled from overflow, misuse of the cleaning chemical from overdosing is radically reduced. Janitorial service workers are used to dosing their own dishwashers and clothes washers, which normally have fill cups. They are also used to dispensing chemicals from a squirt/squeeze bottle. This assists the logic of applying an exact portion of chemical to the secondary reservoir, which meters slowly into a selected bucket and wringer combination.

All of the applicant's mopping wringers are specifically designed to only fit on a specific size and type of bucket, as opposed to other manufacturers, whose wringers can be removed and placed on other types and sizes of buckets, and whose volumes vary so that precise proportioning cannot be achieved.

However, when a secondary reservoir is to be used with a bucket having a different volumetric capacity defined by its first indicator, a baffle plate or adaptor can be located in the secondary reservoir to reduce the volumetric capacity defined by the second indicator.

The opening of the secondary reservoir is large enough to allow for a mophead to "wash through" any detergent left in the secondary reservoir.

The cleaning chemical dispensing system represents real benefit to the cleaning industry. Preferably, the secondary reservoir is a "built in" part of the wringer and cannot be separated or tossed aside by janitorial staff. However, the secondary reservoir can be a detachable device. The secondary reservoir is extremely environmentally friendly by reducing over usage of chemicals, is simple to use, reduces expense, simplifies training, does away with label reading and calculation, overcomes language difficulties, and reduces large amounts of waste in packaging materials.

The mop bucket can be transparent or translucent, or include a transparent or translucent wall. This therefore makes filling the mop bucket with cleaning liquid to the first indicator much easier and more accurate.

The embodiments described above are given by way of examples only, and modifications will be apparent to persons skilled in the art without departing from the scope of the invention as defined by the appended claims. For example, the secondary reservoir can be integrally formed as part of, attached directly, or attachable directly to, the mop bucket, instead of the wringer.

What is claimed is:

1. A method for preparing a cleaning solution, comprising steps of:
    providing a bucket with a first indicator corresponding to a first volume, with a mop wringer provided on the mop bucket;
    providing a secondary reservoir arranged at a height above the first indicator, the secondary reservoir having a second indicator corresponding to a second volume, the secondary reservoir having a metering orifice in a base thereof;
    providing a liquid chemical additive having a known viscosity and preferred dilution for use;
    filling the bucket to a level of the first indicator with a cleaning liquid; and
    filling the secondary reservoir to a level of the second indicator with the liquid chemical additive, and allowing the liquid chemical additive to drain through the metering orifice into the cleaning liquid in the bucket;
    wherein the first and second volumes of the cleaning liquid and liquid chemical additive in the bucket and secondary reservoir, respectively, produce the preferred dilution of the liquid chemical additive in the cleaning liquid; and
    wherein dimensions of the metering orifice and the viscosity of the liquid chemical additive are selected so that the secondary reservoir can be filled with the liquid chemical additive to the level of the second indicator before any, or any significant, amount of the liquid chemical additive passes through the metering orifice, and
    maintaining the secondary reservoir stationary relative to the bucket during filling and emptying of the secondary reservoir.

* * * * *